United States Patent [19]

Loker

[11] 4,244,456

[45] Jan. 13, 1981

[54] EJECTED ROLLER SHAFT DISCONNECT MECHANISM

[75] Inventor: W. Aleck Loker, Leonardtown, Md.

[73] Assignee: The United States of America as represented by the Secretary of the Navy, Washington, D.C.

[21] Appl. No.: 944,433

[22] Filed: Sep. 21, 1978

[51] Int. Cl.³ .............................................. F16D 9/00
[52] U.S. Cl. ...................................... 192/27; 192/28; 192/38; 403/2; 403/335
[58] Field of Search ...................... 192/27, 28, 29, 26, 192/38, 44, 45, 12 B; 74/162; 403/2, 335, 337; 64/28 R

[56] References Cited

U.S. PATENT DOCUMENTS

| 2,989,160 | 6/1961 | Woodruff | 192/12 B |
|---|---|---|---|
| 3,243,023 | 3/1966 | Boyden | 192/44 X |
| 3,406,797 | 10/1968 | Toussaint | 192/27 |

FOREIGN PATENT DOCUMENTS 579182   7/1946   United Kingdom ..................... 192/45

Primary Examiner—Rodney H. Bonck
Attorney, Agent, or Firm—Richard S. Sciascia; Harvey A. David

[57] ABSTRACT

A rotary power transmitting shaft decoupling device has a driving element disposed coaxially within a driven element and keyed thereto by a plurality of rollers held in aligned grooves and slots of the driving and driven elements, respectively, by an indexing ring that is coaxial with and surrounds the driven element. Actuation to effect decoupling is effected by arresting rotation of the indexing ring until the rollers become aligned with slots in the ring through which the rollers are ejected.

12 Claims, 4 Drawing Figures

EJECTED ROLLER SHAFT DISCONNECT MECHANISM

BACKGROUND OF THE INVENTION

This invention relates generally to rotary shaft decoupling devices, and more particularly to a novel and improved shaft decoupler which enables interrupting the transmission of torque between a prime mover such as an engine and a driven accessory such as a pump.

A variety of techniques have been employed in existing shaft disconnect mechanisms, all of which suffer from reliability problems, maintainability problems and other aspects that make them undesirable. One type of shaft disconnect in wide use is the "guillotine" type in which a solid rotating shaft is fractured by impact (shear rupture) with a plunger thrust into the plane of rotation of an eccentric lobe or cam. That device, although quite simple, and therefore reliable, causes maintenance problems when it is actuated because of the severity of the impact and the necessity to replace a number of rather expensive parts.

A second disconnect type in wide use consists of a face gear arrangement, also called a curvic coupling, which is caused to separate or disconnect by sliding one half of the gear set axially away from the other half. When the gear teeth no longer mesh one half (the driven half) of the coupling ceases rotation. A major problem with this class of disconnects is wear of the loaded metal surfaces such as the gear teeth and bearing surfaces. As wear due to fretting progresses, a build-up of oxidized wear debris inhibits the sliding motion often times preventing the coupling from disconnecting when called upon. The wear also progressses at times to the extent that the coupling fails during service causing a disconnect inadvertently. This leads to a hazardous situation since it occurs unannounced and results in the inflight loss of an important propulsion subsystem such as a generator or pump. This second category of disconnect design also accounts for a large number of maintenance problems due to the complexity of the design and the need for higher level maintenance attention.

Other existing disconnect designs differ somewhat in the method of decoupling, but exhibit the same basic failings due to wear and the related damage during disconnect. They also share the same safety hazard potential, unreliability and requirement for frequent, higher level maintenance.

SUMMARY OF THE INVENTION

With the foregoing in mind, it is a principal object of this invention to provide an improved rotary shaft decoupler for use in interrupting the delivery of rotary power from an engine, motor, or other prime mover to a driven apparatus, accessory, or the like.

Another object of this invention is the provision of a shaft decoupling device that is actuable within a partial revolution to decouple the driving and driven components thereof in such manner as to permit the driven component to cease rotation or freewheel relative to the driving component.

Yet another object is the provision of a shaft decoupling device that, once actuated to decouple, will maintain the decoupled condition, irrespective of direction of later relative rotations of the components, until such time as the device is purposely restored to a driving condition.

As another object, the invention aims to provide a shaft decoupling device of the foregoing character that is inexpensive to construct, reliable in operation, requires a minimum of maintenance, and can be readily restored to a driving condition without extensive repairs or replacement of costly parts.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
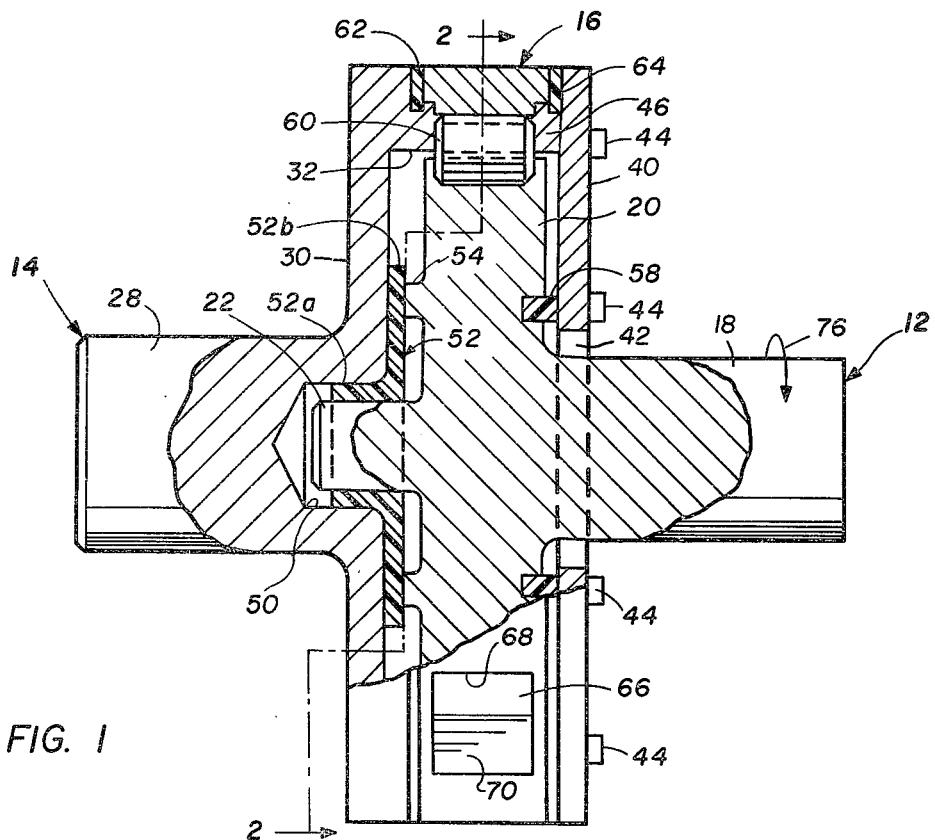
FIG. 1 is a view, partly in elevation and partly in section, illustrating an improved shaft decoupling device embodying this invention.
Figure 2:
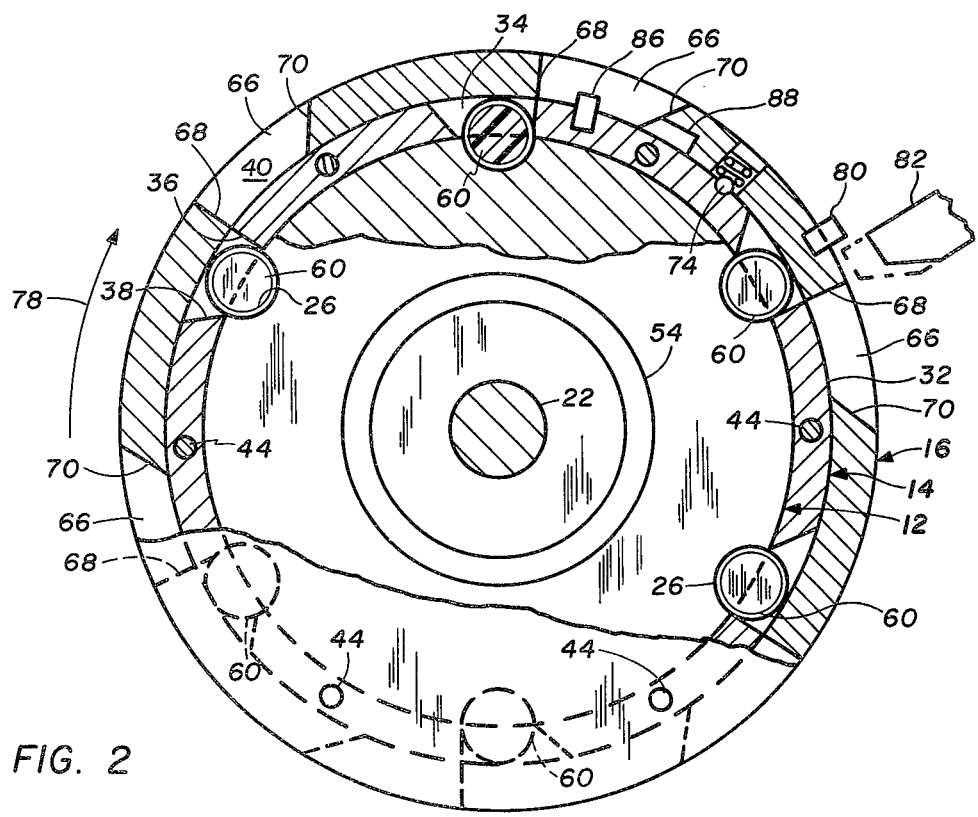
FIG. 2 is a sectional view of the device of FIG. 1 taken substantially along line 2—2 thereof.

In the form of the invention illustrated in FIGS. 1 and 2, there is provided a shaft decoupling device 10 comprising an input or driving component 12, an output or driven component 14, and an indexing component or ring 16. The driving component 12 includes a shaft 18, cylindrical drum or radial flange 20, and an axially extending stub shaft 22. The shaft 18 is adapted to be connected in any suitable manner to the output shaft of an engine, motor, or other rotary prime mover. The periphery of the radial flange 20 is provided with a plurality of axially extending, semi-cylindrical grooves 26 equally spaced about the periphery thereof. In this exemplary embodiment there are six such grooves 26 located at 60° from one another.

The driven component 14 comprises a shaft 28 that is axially aligned with shaft 18, a flange 30, and a hollow cylindrical portion 32 extending from the flange 30 and interrupted by a plurality of six axially extending slots 34. The flange 20 is parallel to the flange 30 and the circumference thereof is closely encircled by and coaxial with the slotted cylindrical portion 32. The slots 34, as is best seen in FIG. 2, are defined by leading edge surfaces 36 that are each substantially parallel to a radius extending through the center of the corresponding slot, and by trailing edge surfaces 38 that are disposed at angles of about 45° relative to the leading edge surfaces, so that the slots 34 are wider going away from the center of the device. The purpose of the angled surfaces 38 will become apparent as this description proceeds.

Fixed to the driven component 14 for rotation therewith is an annular plate 40 having a central aperture 42 through which the shaft 18 of the driving component 12 extends. The plate 40 is secured to the cylindrical portion 32 of the driven component 14 by screws 44 and abuts the end 46 of the slotted cylindrical portion 32.

The driven component 14 is provided with an axial bore 50 in which is received a tubular portion 52a of a combined journal and thrust bearing 52 having a flange portion 52b and preferably formed of a solid lubricant filled plastic material. In the embodiment being described that material comprises a particulate graphite containing polyimide plastic such as those sold under the names "VESPEL SP-21" and "VESPEL SP-22" by Dupont Corporation.

The stub shaft 22 of the driving component 12 is journalled in the tubular portion 52a of the bearing 52, while an annular thrust bearing boss 54 on the flange 20 of the driving component bears against the flange portion 52b.

An annular thrust bearing 58, preferably formed of the same type of material as the combined journal and thrust bearing 52, is partially recessed into the surface of the flange 20 on the opposite side from the bearing boss 54. The thrust bearing 58 is engaged by the plate 40 and cooperates with the bearing 52 to maintain the driving and driven components in their illustrated axial positions.

The flange 20 of the driving component 12 and the slotted cylindrical portion 32 of the driven component 14 are coupled together for transmission of torque and delivery of rotational power by a plurality of cylindrical, force transmitting elements in the form of rollers 60 that lie in the semi-cylindrical grooves 26 of the flange 20 and extend into the slots 34 of the cylindrical portion 32. The rollers 60 are preferably formed of a high strength plastic material such as a polyimide or aramid plastic. A suitable polyimide is sold by the Dupont Corporation under the trade name "VESPEL" and further identified as their "VESPEL SP-1" and "VESPEL KS-105." A suitable aramid plastic is sold by Amoco, Inc. under the trade name "TORLON."

The rollers 60 are normally held in the grooves 26 and slots 34, so as to drivingly couple the driving component 12 to the driven component 14, by the indexing component or ring 16 that encircles the cylindrical portion 32. The indexing ring 16 is disposed between annular, lubricant loaded plastic bearings 62, 64 seated on the inwardly facing marginal edges of the flange 30 and the plate 40 and is provided with a plurality of slots 66 evenly spaced thereabout and of a size capable of passing the rollers 60. These slots 66 are defined on what are normally the trailing sides thereof by edge surface 68 that extend substantially parallel to a radius extending from the axis of the device through the center of the corresponding roller 60. The slots 66 are defined on what are normally the leading sides thereof by edge surfaces 70 that are at angles of about 45° to the corresponding slot trailing edge sufaces 68.

During normal torque and rotational power delivering operation of the device 10, the indexing ring is releasably held in the position illustrated in FIG. 2, relative to the slotted cylindrical portion 32 of the driven component 14, by a ball and spring detent means 74 carried by the index ring and cooperable with a recess in the surface of the cylindrical portion 32. Accordingly, during such normal operation, the entire device 10 rotates as indicated by the arrows 76, 78 in FIGS. 1 and 2.

The ring 16 is adapated to be arrested in its rotation with the rest of the device upon occurrence of a predetermined event in order to bring the grooves 26, slots 34, and the rollers 60 therein into registration with the slots 66 in the indexing ring. To this end, the ring 16 is provided with a pin 80 extending radially therefrom. A stop means in the form of a reciprocable plunger 82 is adapted to be moved from its full line position in FIG. 2 to the dot and dash line position in the path of the pin 80. The plunger 82 may be operated by any suitable mechanism, such as a solenoid responsive to a condition sensing means, to arrest the rotation of the indexing ring 16.

Figure 3:
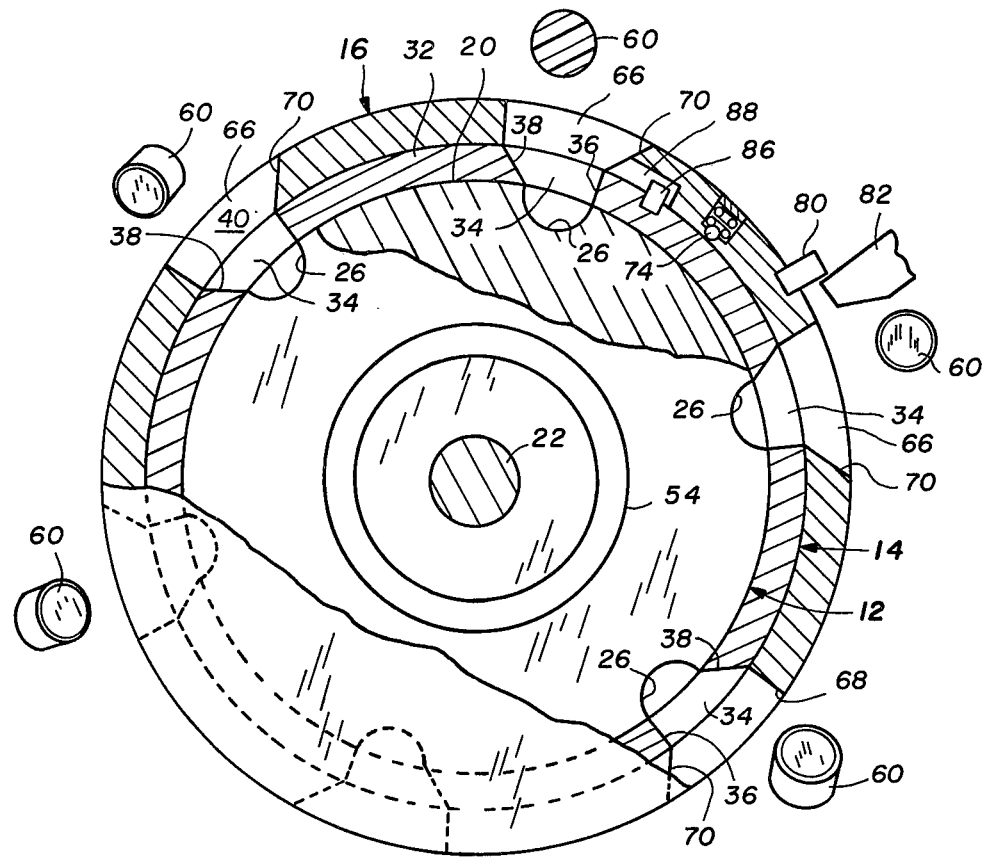
FIG. 3 is a view similar to FIG. 2 but showing parts in different operative positions.

A pin 86, extending from the slotted cylindrical portion 32 of the driven component, cooperates with a groove or slot 88 in the indexing ring 16 to determine the amount of relative rotation permitted between the cylindrical portion and the ring when movement of the ring is arrested by the plunger 82. Thus, the pin 86 allows such relative movement until it engages the end of the slot 88, at which time the cylindrical portion 32 and the ring 16 are positioned as illustrated in FIG. 3 with the slots 34 of the cylindrical portion in registration with the slots 66 of the ring 16.

MODE OF OPERATION

Consider the device 10 to be in a rotary power delivering condition wherein the various parts are in the positional relationships illustrated in FIGS. 1 and 2, and the entire device to be rotating in the direction indicated by the arrows 76, 78. In that condition power is transmitted from the driving component 12, through the rollers 60 to the driven component 14. Of course the driving component 12 is considered to be suitably connected to some engine, motor or other prime mover, and the driven component to be suitably connected to some rotary power utilization apparatus such as a pump, generator, or the like.

Now, upon actuation of the plunger 82 into the path of the pin 80, the rotation of the ring 16 will be arrested and the rotation of the rest of the components will continue. As the rollers 60 move under the slots 66 in the indexing ring 16, the centripital restraining forces of the ring on the rollers are removed and the latter fly outwardly under the influence of centrifugal forces and the wedging actions of the sloping surfaces 38. The rollers 60 are thereby ejected from the device 10 and the driving component 12 is free to continue rotation, with the grooved flange 20 thereof turning within the cylindrical portion 32 of the driven component 14.

When the pin 86 reaches the end of the slot 88, rotational inertia of the utilization apparatus will cause the driven component 12, through the pin 86, to again pickup rotation of the ring 16, shearing the pin 80. Thus, it should be noted that pin 80 is conveniently of a more readily shearable material than pin 86, or is suitably weakened in anticipation of such shearing. Thereafter, the driven component 14 and ring 16 will rotate together as they slow down from the effects of friction and other loads of the utilization apparatus.

Because of the use of friction reducing solid lubricant filled plastic bearings 52 and 58, and the use of high strength plastic rollers 60, the driving component 12 is fully isolated from metal to metal contact that could cause galling or fretting during use prior to a decoupling actuation. Moreover, when actuated to effect a decoupling, the plastic rollers completely clear the device and, because of their low cost, can be regarded as expendable. The bearings also assure that the driving component 12 can continue to rotate without damage or undue wear to the device until such time as the device is restored to a power transmitting condition by insertion of new rollers 60, pin 80, and setting of the indexing ring in a roller retaining position.

DESCRIPTION OF AN ALTERNATIVE EMBODIMENT

Figure 4:
FIG. 4 is a fragmentary sectional view illustrating a different embodiment of the invention.

There will now be described another embodiment of the invention which differs from that already discussed in the means for arresting rotation of the indexing ring and for limiting the amount of rotation of the driven component relative to the indexing ring during a decoupling event. Referring to FIG. 4, in which parts corresponding to previously described parts have corresponding reference numerals but with prime marks, a decoupling device 10' comprises an indexing ring 16' having slots 66' encircles the cylindrical portion 32' of a drive component having slots 34'. Rollers 60' are seated in semi-cylindrical grooves 26' in a drum or flange portion 20' of a driving component and project into the slots 34' so as to couple the driving and driven components together.

The indexing ring 16' is releasably held in its illustrated position by detent means comprising a spring biased ball 74' that is engaged in a corresponding depression in the slotted cylindrical portion 32'.

The ball 74' is partially retained in a hollow plunger 80' and is adapted to be displaced inwardly of the plunger against the action of a spring 90 within the plunger. The plunger 80' is carried in a stepped bore 92 in the ring 16 from which a portion of the plunger projects radially outwardly. A spring 94 is disposed around the plunger 80' in the bore and urges the plunger in a direction radially inwardly of the device 10'. Movement of the plunger in that direction, however, is prevented by the cylindrical portion 32' during operation of the device to transmit rotational power. A recess 96 is formed in the surface of the slotted cylindrical portion 32' of the driven component, which recess is adapted to receive the inner end of the plunger 80' and is disposed at a predetermined angular distance therefrom. An actuating plunger 82' is adapted to move into the path of the hollow plunger 80' when a decoupling event is to take place.

Assuming the device 10' to be rotating in the direction of the arrow 98, actuation of the plunger 82' will bring it into the path of the plunger 80'. When the plunger 80' strikes the plunger 82', the rotation of the ring 16' will be arrested, and the portion 32' and flange 20' will continue rotation within the ring. As the rotation of the portion 32' relative to the ring 16' brings the rollers 60' and slots 34' into registration with the slots 66' of the ring 16', the rollers 60' will be released from the grooves 26' and will be ejected through the slots 66', thereby decoupling the driving component from the driven component. Substantially simultaneously, the recess 96 will move into alignment with the plunger 80', the inner end of which will drop into the recess under the influence of the spring 94 so that outer end will be retracted from engagement with the actuating plunger 82'. Accordingly, the ring 16' will become locked to the driven element and released from the arresting operation of the plunger 82' and will begin to rotate again with the driven component during its deceleration.

The foregoing construction avoids the use of a shear pin and is readily restorable to a power transmitting condition, with the only replaceable items required being the ejected rollers 60'.

Obviously, many modifications and variations of the present invention are possible in the light of the above teachings. For example, cage means may be provided around the device to catch the ejected rollers for reuse. Also, other forms of detent, indexing ring arresting means, and rotation limiting means may be employed. It is therefore to be understood that, within the scope of the claims the invention may be practiced otherwise than as specifically described.

I claim:
1. A rotary shaft decoupling device comprising:
   a rotary driving component comprising a circular flange portion presenting a substantially cylindrical surface interrupted by a plurality of axially extending grooves;
   a rotary driven component having a cylindrical portion closely encircling and coaxial with said cylindrical surface and characterized by a plurality of slots;
   a plurality of force transmitting elements seated in said grooves and extending into said slots so as to key said driving component to said driven component;
   indexing means, coaxial with and closely encircling said driven component, for holding said force transmitting elements in said slots and grooves, said indexing means being characterized by a plurality of slots;
   detent means for releasable holding said indexing means for rotation with said driving and driven components and in a predetermined rotational position relative to said driven component, in which position said slots of said indexing means are displaced from registration with said slots of said driven component; and
   actuating means for arresting rotation of said indexing means until rotation of said driving and driven components brings said grooves and said slots of said driven component into substantial registration with said slots of said indexing means, whereby said force transmitting elements are ejected from said device and said driving and driven components are released for rotation independent of one another.

2. A rotary shaft decoupling device as defined in claim 1, and wherein said actuating means comprises:
   a stop member actuable between first and second positions;
   said indexing means comprising means for engaging said stop member when in said second position, whereby rotation of said indexing means is arrested and held while said driving and driven components rotate a predetermined angular distance relative to said indexing means.

3. A rotary shaft decoupling device as defined in claim 2, and further comprising:
   limit means on said indexing means and said driven component and cooperable to initiate rotation of said indexing means with said driven component when said driven component has rotated said predetermined angular distance and said slots therein are substantially aligned with said slots in said indexing means.

4. A rotary shaft decoupling device as defined in claim 3, and wherein:
   said slots in said driven component are characterized by substantially radially extending leading edge surfaces and by sloping trailing edge surfaces, said trailing edge surfaces being operative to assist in ejection of said force transmitting elements.

5. A rotary shaft decoupling device as defined in claim 3, and wherein:
   said means for engaging said stop member comprises a shearable first pin.

6. A rotary shaft decoupling device as defined in claim 5, and wherein:

said limit means comprises a circumferential slot of predetermined length in one of said indexing means and said driven component, and a second pin extending from the other thereof into said circumferential slot, said second pin being more resistant to shear than said shearable first pin.

7. A rotarty shaft decoupling device as defined in claim 3 and wherein said means for engaging said stop member and said limit means comprise:

a plunger extending radially outwardly of said indexing means and engageable by said stop member when in said second position; spring means urging said plunger radially inwardly of said indexing means;

said driven component being operative to prevent movement of said plunger radially inwardly of said indexing means when said indexing means is in said predetermined rotational position relative to said driven component; and said driven component being characterized by a recess positioned to receive the inner end of said plunger under the influence of said spring when said driven member has moved through said predetermined angular distance relative to said indexing means, whereby said plunger is withdrawn from engagement with said stop member and connects the indexing means to said driven member for rotation therewith.

8. A rotary shaft decoupling device as defined in claim 7, and wherein:

said plunger is hollow; and said detent means comprises a second spring disposed in said plunger and a ball partially received in said plunger and resiliently urged by said second spring into engagement with a corresponding depression in the periphery of said cylindrical portion of said driven component.

9. A rotary shaft decoupling device as defined in claim 8, and wherein:

said force transmitting elements comprise a plurality of rollers.

10. A rotary shaft decoupling device as defined in claim 9, and wherein:

said rollers are formed of a high impact resistant plastic material.

11. A rotary shaft decoupling device comprising:

a driving component comprising an input shaft, a first circular flange extending from said input shaft, and a stub shaft extending in axial alignment with said input shaft, said circular flange being characterized by a plurality of semi-cylindrical axially extending grooves spaced equidistantly about the periphery thereof;

a driven component comprising an output shaft disposed in axial alignment with said input shaft and said stub shaft, a second circular flange extending from said output shaft and in spaced parallel relation to one side of said first flange, a hollow cylindrical portion extending axially from said second flange and encircling the periphery of said first flange in closely spaced coaxial relation thereto, said cylindrical portion being characterized by a plurality of axially extending first slots therethrough corresponding to said grooves, and an annular plate encircling said input shaft and disposed in spaced parallel relation to the other side of said first flange, said plate being fixed to said hollow cylindrical portion for rotation therewith;

a plurality of plastic, force transmitting rollers, each seated in one of said grooves and extending into one of said first slots in said cylindrical portion so as to key said driving and driven components together;

an indexing ring coaxially encircling said cylindrical portion and having a like plurality of slots, said ring being operative in a first position relative to said cylindrical portion to retain said rollers in said grooves;

yieldable detent means for releasably holding said indexing ring in said first position;

stop means, actuable to arrest rotation of said indexing ring, for effecting a change of position of said ring relative to said cylindrical portion to a second position wherein said first slots are in registration with said second slots and said rollers are ejected through said second slots; and limit means for limiting relative rotation between said indexing ring and said cylindrical portion.

12. A rotary shaft decoupling device as defined in claim 11, and wherein:

said first slots are characterized by leading edge surfaces extending substantially tangentially of said rollers and trailing edge surfaces that diverge outwardly from said leading edge surfaces so as to promote ejection of said rollers.

* * * * *